United States Patent
Konishi et al.

(10) Patent No.: US 6,835,440 B1
(45) Date of Patent: Dec. 28, 2004

(54) LIGHT TRANSMITTING PLATE

(75) Inventors: Yuichiro Konishi, Tokyo (JP); Kazuyuki Obuchi, Kanagawa-ken (JP); Tatsuo Miyazaki, Kanagawa-ken (JP); Issei Ishimaru, Kanagawa-ken (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/856,457

(22) PCT Filed: Dec. 7, 1999

(86) PCT No.: PCT/JP99/06850

§ 371 (c)(1),
(2), (4) Date: Sep. 18, 2001

(87) PCT Pub. No.: WO00/34809

PCT Pub. Date: Jun. 15, 2000

(30) Foreign Application Priority Data

Dec. 7, 1998 (JP) .......................... 10/347265
Jan. 29, 1999 (JP) .......................... 11/022049

(51) Int. Cl.[7] .............................. G02B 6/10
(52) U.S. Cl. .................. 428/156; 428/167; 359/599; 359/640; 362/31; 362/339; 349/65; 264/1.24; 385/146
(58) Field of Search .................... 428/156, 167, 428/220, 412; 359/599, 628, 640; 362/31, 339; 349/65; 385/146; 264/1.24

(56) References Cited

U.S. PATENT DOCUMENTS

| | | | |
|---|---|---|---|
| 5,354,517 A | | 10/1994 | Yamasaki et al. ............ 264/1.1 |
| 5,516,456 A | * | 5/1996 | Shinohara et al. ...... 252/299.01 |
| 5,575,549 A | * | 11/1996 | Ishikawa et al. .............. 362/31 |
| 5,727,107 A | * | 3/1998 | Umemoto et al. .......... 385/116 |
| 6,151,169 A | * | 11/2000 | Kim ............................ 359/640 |
| 6,155,692 A | * | 12/2000 | Ohkawa ....................... 362/31 |
| 6,396,634 B1 | * | 5/2002 | Ishikawa et al. ............ 359/599 |
| 6,633,722 B1 | * | 10/2003 | Kohara et al. .............. 385/146 |

FOREIGN PATENT DOCUMENTS

| | | | | |
|---|---|---|---|---|
| JP | | 5-205326 | 8/1993 | |
| JP | | 7-118344 | 5/1995 | |
| JP | | 8-94852 | 4/1996 | |
| JP | | 10-139865 | 5/1998 | |
| JP | | 10-253831 | 9/1998 | |
| WO | | WO99/57602 | * 11/1999 | ......... G02F/1/1335 |

* cited by examiner

*Primary Examiner*—Harold Pyon
*Assistant Examiner*—Alicia Chevalier
(74) *Attorney, Agent, or Firm*—Armstrong, Kratz, Quintos, Hanson & Brooks, LLP (57) ABSTRACT

A light guide plate of the present invention is characterized by being obtained by melt molding a thermoplastic resin having a melt flow rate of at least 50 [g/10 min.] under a load of 2.16 kgf at 280° C.

The thermoplastic resin is preferably a thermoplastic resin containing an alicyclic structure, more preferably a norbornene-based polymer.

10 Claims, 3 Drawing Sheets

LIGHT TRANSMITTING PLATE

BACKGROUND OF THE INVENTION

1. Field of the Invention

The present invention relates to a light guide plate, more particularly to a light guide plate with an excellent appearance and redeced irregularity in luminance, in particular a thin-walled, large screen size light guide plate.

2. Description of the Related Art

A light guide plate is one optical member used in a backlight unit mounted in various display devices. For example, an edge light type planar light source device is generally comprised of a light guide plate for guiding light from a light source entering from a side end face in a direction parallel to the plate face and causing it to be emitted in a direction substantially perpendicular to the plate face, a reflector arranged so as to surround the light source for efficiently guiding the light of the light source not directly entering the light source-side end face of the light guide plate, a light diffusion sheet or plate arranged at the light emitting face side of the light guide plate for causing diffusion of light emitted from the emission face, and a reflection sheet or plate arranged at the light reflection face side of the light guide plate for returning the light leaked from the light guide plate to the light guide plate once again.

Note that the back face of the light guide plate (light reflection face) is formed with a pattern of various shapes such as dots, cone cuts, and V-grooves for raising or uniformly diffusing the luminance of the light introduced into the light guide plate.

The light guide plate has to have redeced irregularity in luminance since the entire emission face serves as the direct light source of various types of display devices. Further, it is believed desirable that the color temperature be high. Therefore, in the past, use has been made of a light guide plate made by injection molding a colorless transparent thermoplastic resin such as polymethyl methacrylate (PMMA) or polycarbonate (PC). Further, recent light guide plates have tended to be made thinner from the viewpoint of increasing the screen size or economizing the space.

The PMMA normally used for molding a light guide plate, however, has a high melt viscosity at the time of injection molding and inferior fluidity and is difficult to mold into a thin-walled, large screen size of over 10 inches, further over 14 inches. Even if able to be molded, since it is thin, there was the problem that hygroscopic deformation ended up occurring. On the other hand, if the resin temperature is raised to improve the fluidity, the resin is liable to foam in the cylinder and a shaped article with a good appearance is difficult to obtain such as due to the occurrence of voids. Further, since PC has a high heat deformation temperature, the molding temperature has to be raised in order to obtain a fluidity sufficient for molding thin articles. As a result, due to the effects of moisture absorption, the resin is liable to hydrolyze and foam in the cylinder. In the same way as the case of PMMA, voids occurred in the shaped article (light guide plate) and it was difficult to obtain a shaped article with a good appearance. Therefore, a molding material has been sought which enables molding of a thin-walled light guide plate of a large screen size of over 10 inches or over 14 inches with a good appearance by injection molding.

Further, when using PMMA or PC as the molding material and forming V-grooves etc. in the back face of the light guide plate, there has been the problem that it was not possible to precisely transfer the pattern of the fine shapes to the light reflection face side of the thinnest part, that is, the narrow end portion, in a wedge-shaped light guide plate where the thickness of the light guide plate becomes gradually thinner the further from the light source. This becomes a cause of a reduction of the homogenity of the light emitted due to luminance unevenness.

SUMMARY OF THE INVENTION

An object of the present invention is to provide a light guide plate of a good appearance and redeced irregularity in luminance, in particular a thin-walled, large screen size light guide plate, and a process for production of the same.

The present inventors took note of the melt fluidity of a thermoplastic resin and engaged in intensive studies with the aim of improving it. As a result, they discovered that by melt molding a thermoplastic resin having a specific melt flow rate (hereinafter also referred to as an "MFR"), it is possible to obtain a light guide plate with a good appearance and redeced irregularity in luminance, in particular a thin-walled, large screen size light guide plate, and thereby completed the present invention.

A light guide plate according to the present invention is characterized by being obtained by melt molding a thermoplastic resin having a melt flow rate of at least 50 [g/10 min.] under a load of 2.16 kgf at 280° C.

A process of production of a light guide plate according to the present invention is characterized by melt molding a thermoplastic resin having a melt flow rate of at least 50 [g/10 min.] under a load of 2.16 kgf at 280° C.

Effects

According to the present invention, there is provided a light guide plate with a good appearance and redeced irregularity in luminance, in particular a thin-walled, large screen size (for example, at least 10 inches size, preferably at least 14 inches size) light guide plate, and a process for production of the same.

In particular, a thermoplastic resin having an MFR of at least 50 [g/10 min.] has a low viscosity. Therefore, according to the present invention using such a resin, the melt fluidity of the resin at the time of melt molding can be improved and a shaped article (light guide plate) having a good appearance can be obtained. In particular, if a resin with a low viscosity is used when molding a thin-walled, large screen light guide plate, fluidization and plastization become possible even at a low temperature and cooling and solidification become easy. Further, since the melt fluidity is good, it is possible to precisely transfer even a pattern of fine shapes such as V-grooves to the reflection face side of the light guide plate. Further, the cycle time at the time of molding is comparatively short, the productivity of the light guide plate rises, the residence time in the molten state becomes shorter, and the rate of occurrence of voids, burn marks, and discoloration falls. Therefore, it becomes easy to obtain a light guide plate with a good appearance and redeced irregularity in luminance even when producing a thin-walled, large screen size (for example, at least 10 inches size or at least 14 inches size) light guide plate.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, the light guide plate according to the present invention will be explained based on the following embodiments.

These embodiments, however, are described for the purpose of facilitating understanding of the present invention and are not described for limiting the present invention.

Thermoplastic Resin

As the thermoplastic resin used in the present invention, a thermoplastic resin having a specific MFR is used.

Specifically, the MFR of the thermoplastic resin is at least 50 [g/10 min.], preferably 50 to 250 g/min, more preferably 60 to 180 [g/10 min.]. When the MFR of the thermoplastic resin is excesssively low, the moldability is poor, so this is not preferable. Further, when conversely it is excessively high, the mechanical strength is inferior, a thin-walled, large screen size light guide plate is hard to produce, and the moldability is inferior such as with occurrence of burrs.

The thermoplastic resin used in the present invention is not particularly limited as to its 50% breaking energy in a drop-weight test measured for a 3 mm thick plate of the same using a missile-type weight of a radius of ¾ inch, but preferably is at least 0.1 J, more preferably at least 0.05 J. The mechanical strength of the light guide plate obtained at the time of this range is suitably held even if the light guide plate is thin and has a large screen size. Further, it is resistant to occurrence of cracks or fractures and can be easily assembled into backlight units.

The glass transition temperature (Tg) of the thermoplastic resin used in the present invention may be suitably selected in accordance with the object of use, but a higher one is preferable from the environment of use of the light guide plate. Normally, it is at least 70° C., preferably 70 to 250° C., more preferably 80 to 200° C. In this range, the properties of the heat resistance and moldability are well balanced.

The refractive index at 25° C. of the thermoplastic resin used in the present invention may be suitably selected in accordance with the object of use, but preferably is 1.40 to 1.70, more preferably 1.50 to 1.60, still more preferably 1.52 to 1.56. The optical characteristics are desirable in this range.

As the thermoplastic resin used in the present invention, for example, polymethyl methacrylate, polyethyl methacrylate, poly-n-propyl methacrylate, poly-n-butyl methacrylate, poly-n-hexyl methacrylate, polyisopropyl methacrylate, polyisobutyl methacrylate, poly-t-butyl methacrylate, polybenzyl methacrylate, polyphenyl methacrylate, poly-1-phenylethyl methacrylate, poly-2-phenylethyl methacrylate, polyfurfuryl methacrylate, polymethyl acrylate, polyethyl acrylate, poly-n-butyl acrylate, polybenzyl acrylate, poly-2-chlorethyl acrylate, polyvinyl acetate, polyvinyl benzoate, polyvinylphenyl acetate, polyacrylonitrile, poly-α-methylacrylonitrile, polymethyl-α-chloracrylate, poly-o-chlorstyrene, poly-p-fluorostyrene, poly-p-isopropylstyrene, polystyrene, polycarbonate, thermoplastic resin containing an alicyclic structure, etc. may be mentioned.

These thermoplastic resins may be used alone or in combinations of two or more types.

Among the above thermoplastic resins, from the viewpoint of the ease of molding of a thin-walled, large screen size light guide plate, a thermoplastic resin containing an alicyclic structure is preferred. The heat decomposition temperature of a thermoplastic resin containing an alicyclic structure is high, so by using such a resin, the moldability is further improved. In particular, it becomes possible to mold without heat decomposition or hydrolysis even at a high temperature. A light guide plate with a good appearance can therefore be obtained. Further, since the melt fluidity is improved, there is less of a liability of transfer defects arising even when forming a pattern of fine shapes such as V-grooves in the reflection face of the light guide plate. Further, even when producing a thin-walled, large screen size light guide plate having heat resistance, having grooves as a pattern of fine shapes, it is possible to obtain a light guide plate redeced irregularity in luminance. Further, an alicyclic-structure containing thermoplastic resin is superior in transparency or heat resistance, so can be further improved in luminance. Even if the light guide plate is used for a long time, there is less liability of occurrence of deformation due to changes in temperature. This makes it suitable for application as a light guide plate.

The alicyclic-structure containing thermoplastic resin has alicyclic structures at its main chain and/or side chains. From the viewpoint of the mechanical strength, heat resistance, etc., one containing alicyclic structures at its main chain is preferable.

As the alicyclic structures of the polymer, saturated cyclic hydrocarbon structures, unsaturated cyclic hydrocarbon structures, etc. may be mentioned, but from the viewpoint of mechanical strength and heat resistance, cycloalkane structures or cycloalkene structures are preferable. In particular, a thermoplastic resin having cycloalkane structures is most preferable.

The number of carbon atoms making up the alicyclic structures is not particularly limited, but is usually 4 to 30, preferably 5 to 20, more preferably 5 to 15. In this range, the properties of the mechanical strength, heat resistance, and moldability are well balanced.

The ratio of the monomers giving repeating units of alicyclic structures in the thermoplastic resin containing an alicyclic structure used in the present invention may be suitably selected in accordance with the object of use, but normally is at least 40 mol %, preferably at least 50 mol %. If the ratio of monomers giving repeating units of alicyclic structures in the alicyclic structure-containing thermoplsatic resin is excessively small, the heat resistance is inferior. By making the range from 40 to 100 mol %, the transparency, mechanical strength, heat resistance, etc. are well balanced.

The balance of the thermoplastic resin containing an alicyclic structure other than the repeating units having the alicyclic structure is not particularly limited and may be suitably selected in accordance with the object of use.

As specific examples of such a thermoplastic resin containing an alicyclic structure, for example, (1) norbornene-based polymers, (2) monocyclic cyclic olefin-based polymers, (3) cyclic conjugated diene-based polymers, (4) vinyl alicyclic hydrocarbon-based polymers, etc. may be mentioned. Among these, norbornene-based polymers and cyclic conjugated diene-based polymers are preferable, while norbornene-based polymers are more preferable. When a norbornene-based polymer is used, the stability of appearance of the obtained light guide plate becomes much more remarkable, the occurrence of luminance unevenness is greatly reduced, and a high mechanical strength is imparted to the light guide plate. Therefore, even if molding a thin-walled light guide plate with a large screen size, the new effect is obtained that cracks or fractures are difficult to occur and assembly into a backlight unit becomes easy.

(1) Norbornene-Based Polymers

The norbornene-based polymers are not particularly limited, but for example the polymers disclosed in Japanese Unexamined Patent Publication (Kokai) No. 2-173112, Japanese Unexamined Patent Publication (Kokai) No. 3-14882, Japanese Unexamined Patent Publication (Kokai) No. 5-9223, Japanese Unexamined Patent Publication (Kokai) No. 3-122137, etc. may be used.

Specifically, ring-opening polymers of norbornene-based monomers and their hydrogenates, addition type (co) polymers of norbornene-based monomers, addition-type copolymers of norbornene-based monomers and vinyl-based compounds able to be copolymerized with the same, etc. may be mentioned. Among these, ring-opening polymers of norbornene-based monomers and their hydrogenates, addition type polymers of norbornene-based monomers, and addition-type copolymers of norbornene-based monomers and vinyl-based compounds able to be copolymerized with the same are preferable in balancing the heat resistance and moldability.

As the norbornene-based monomers, for example, bicyclo [2,2,1]hept-2-ene (commonly called "norbornene"), 5-methyl-bicyclo[2,2,1]hept-2-ene, 5,5-dimethyl-bicyclo[2,2,1[hept-2-ene, 5-ethyl-bicyclo[2,2,]hept-2-ene, 5-butyl-bicyclo[2,2,1]hept-2-ene, 5-ethylidene-bicyclo[2,2,1]hept-2-ene, 5-hexyl-bicyclo[2,2,1]hept-2-ene, 5-octyl-bicyclo[2,2,1]hept-2-ene, 5-octadecyl-bicyclo[2,2,1]hept-2-ene, 5-ethylidene-bicyclo[2,2,1]hept-2-ene, 5-methylidene-bicyclo[2,2,1]hept-2-ene, 5-vinyl-bicyclo[2,2,1]hept-2-ene, 5-propenyl-bicyclo[2,2,1]hept-2-ene, 5-methoxycarbonyl-bicyclo[2,2,1]hept-2-ene, 5-cyano-bicyclo[2,2,1]hept-2-ene, 5-methyl-5-methoxycarbonyl-bicyclo[2,2,1]hept-2-ene; 5-methoxycarbonyl bicyclo[2,2,1]hept-2-ene, 5-ethoxycarbonyl bicyclo[2,2,1]hept-2-ene, 5-methyl-5-methoxycarbonyl bicyclo[2,2,1]hept-2-ene, 5-methyl-5-ethoxycarbonyl bicyclo[2,2,1]hept-2-ene, bicyclo[2,2,1] hept-5-enyl-2-methylpropionate, bicyclo[2,2,1]hept-5-enyl-2-methyloctanate, bicyclo[2,2,1]hept-2-ene-5,6-dicarboxylic acid anhydride, 5-hydroxymethyl bicyclo[2,2,1]hept-2-ene, 5,6-di(hydroxymethyl)bicyclo[2,2,1]hept-2-ene, 5-hydroxy-i-propylbicyclo[2,2,1]hept-2-ene, 5,6-dicarboxy bicyclo[2,2,1]hept-2-ene; 5-cyanobicyclo[2,2,1] hept-2-ene, bicyclo[2,2,1]hept-2-ene-5,6-dicarboxylic acid imide;

tricyclo[4,3,0,1$^{2,5}$]deca-3,7-diene (commonly called "dicyclopentadiene"), tricyclo[4,3,0,1$^{2,5}$]deca-3-ene; tricyclo[4,4,0,1$^{2,5}$]undeca-3,7-diene or tricyclo[4,4,0,1$^{2,5}$] undeca-3,8-diene or their partial hydrogenates (or adducts of cyclopentadiene and cyclohexene)tricyclo[4,4,0,1$^{2,5}$] undeca-3-ene; 5-cyclopentyl-bicyclo[2,2,1]hept-2-ene, 5-cyclohexyl-bicyclo[2,2,1]hept-2-ene, 5-cyclohexenyl-bicyclo[2,2,1]hept-2-ene, 5-phenyl-bicyclo[2,2,1]hept-2-ene;

tetracyclo[4,4,0,1$^{2,5}$,1$^{7,10}$]-dodeca-3-ene (also simply called tetracyclododecene), 8-methyltetracyclo[4,4,0,1$^{2,5}$, 1$^{7,10}$]-dodeca-3-ene 8-ethyltetracyclo[4,4,0,1$^{2,5}$,1$^{7,10}$]-dodeca-3-ene, 8-methylidenetetracyclo[4,4,0,1$^{2,5}$,1$^{7,10}$]-dodeca-3-ene, 8-ethylidenetetracyclo[4,4,0,1$^{2,5}$,1$^{7,10}$]-dodeca-3-ene, 8-vinyltetracyclo[4,4,0,1$^{2,5}$,1$^{7,10}$]-dodeca-3-ene, 8-propenyl-tetracyclo[4,4,0,1$^{2,5}$,1$^{7,10}$]-dodeca-3-ene, 8-methoxycarbonyltetracyclo[4,4,0,1$^{2,5}$,1$^{7,10}$]-dodeca-3-ene, 8-methyl-8-methoxycarbonyltetracyclo[4,4,0,1$^{2,5}$,1$^{7,10}$]-dodeca-3-ene, 8-hydroxymethyltetracyclo[4,4,0,1$^{2,5}$,1$^{7,10}$]-dodeca-3-ene, 8-carboxytetracyclo[4,4,0,1$^{2,5}$,1$^{7,10}$]-dodeca-3-ene; 8-cyclopentyl-tetracyclo[4,4,0,1$^{2,5}$,1$^{7,10}$]-dodeca-3-ene, 8-cyclohexyl-tetracyclo[4,4,0,1$^{2,5}$,1$^{7,10}$]-dodeca-3-ene, 8-cyclohexenyl-tetracyclo[4,4,0,1$^{2,5}$,1$^{7,10}$]-dodeca-3-ene, 8-phenyl-cyclopentyl-tetracyclo[4,4,0,1$^{2,5}$, 1$^{7,10}$]-dodeca-3-ene;

tetracyclo[4,4,0,1$^{10,13}$,0$^{2,7}$]trideca-2,4,6,11-tetraene (also called "1,4-methane-1,4,4a,9a-tetrahydrofluorene"), tetracyclo[4,4,0,1$^{11,14}$,0$^{3,8}$]-tetradeca-3,5,7,12-tetraene (also called "1,4-methane-1,4,4a,5,10,10a-hexahydroanthracene"), pentacyclo-[6,5,1,1$^{3,6}$,0$^{2,7}$,0$^{9,13}$] pentadeca-3,10-diene, pentacyclo[7,4,0,1$^{3,6}$,1$^{10,13}$,0$^{2,7}$] pentadeca-4, 11-diene; tetramers of cyclopentadiene; and other norbornene-based monomers etc. may be mentioned.

These norbornene-based monomers may be used alone or in combinations of two or more types.

As the vinyl-based compounds able to be copolymerized with the norbornene-based monomers, in particular chain-like vinyl compounds are suitable in increasing the heat resistance or transparency. Specifically, ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicocene, and other $C_2$ to $C_{20}$ ethylene or α-olefin; cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, and other cycloolefins; 1,4-hexadiene, 4-methyl-1,4-hexadiene, 5-methyl-1,4-hexadiene, 1,7-octadiene, and other nonconjugated dienes; etc. may be mentioned.

These vinyl-based compounds may be used alone or in combinations of two or more types.

The ratio of the norbornene-based monomer and the vinyl compound may be suitably selected in accordance with the object of use, but the molar ratio (norbornene-based monomer/vinyl compound) is usually 40/60 to 100/0, preferably 50/50 to 100/0. When this, the mechanical strength, heat resistance, and transparency of the light guide plate are well balanced.

The ring-opening polymerization of the norbornene-based monomer or norbornene-based monomer and vinyl-based compound able to be copolymerized with this usually may be performed in the presence of a ring-opening polymerization catalyst and molecular weight adjusting agent. As the ring-opening polymerization catalyst, for example, catalyst systems comprised of halides, nitrates, or acetylacetone compounds of ruthenium, rhodium, palladium, osmium, iridium, platinum, and other metals and reducing agents or catalyst systems comprised of halides or acetylacetone compounds of metals such as titanium, vanadium, zirconium, tungsten, and molybdenum and organoaluminum compounds may be mentioned. As the molecular weight adjusting agent, normally a chain-like monoolefin or chain-like conjugated dienes are used, but for example, 1-butene, 2-butene, 1-pentene, 1-hexene, 1-heptene, 1-octene, 1-dodecene, 1,4-hexadiene, etc. may be mentioned. The amount of the molecular weight adjusting agent used is suitably selected according to the polymerization conditions, but usually is, in terms of a molar ratio with respect to the total monomers, 1/10 to 1/500, preferably 1/25 to 1/250, more preferably 1/50 to 1/200. When in this range, the molecular weight is easy to control and the MFR becomes easy to control. As the method of addition of a molecular weight adjusting agent, for addition to the reaction system at a high accuracy, it is preferable to use it diluted by a reaction solvent etc. in advance or add it using an apparatus with a high measurement accuracy. As the accuracy of the amount of the molecular weight adjusting agent added, normally the range of error of the amount added required for the desired molecular weight is not more than 3%, preferably not more than 2%, more preferably not more than 1%. At this time, the molecular weight can be easily controlled and the MFR can be easily controlled. The ring-opening polymerization reaction may be performed in a solvent or not in the presence of a solvent at a polymerization temperature of −50 to 100° C. and a polymerization pressure of 0 to 50 kg/cm$^2$.

A hydrogenate of the ring-opening polymer of the norbornene-based monomer may be produced by an ordinary method. Specifically, it may be obtained by hydrogenation of a polymerization solution of a ring-opening polymer of the above norbornene-based monomer in the presence of a hydrogenation catalyst. The hydrogenation catalyst is not particularly limited, but normally a nonhomogeneous catalyst or homogeneous catalyst is used. As the nonhomogeneous catalyst, for example, nickel, palladium, platinum, or nickel/silica, nickel/diatomaceous earth, nickel/alumina, palladium/carbon, palladium/silica, palladium/diatomaceous earth, palladium/alumina, etc. may be mentioned. As the homogeneous catalyst, for example, a catalyst comprised of a combination of a transition metal compound and alkylaluminum metal compound or alkyllithium, for example, a catalyst comprised of a combination of cobalt acetate/triethylaluminum, cobalt acetate/triisobutyl-aluminum, nickel acetate/triethylaluminum, nickel acetate/triisobutylaluminum, nickel acetylacetnate/triethylaluminum, nickel acetylacetnate/triisobutyl-aluminum, titanocene chloride/n-butyllithium, zirconocene chloride/n-butyllithium, etc. may be mentioned. These hydrogenated catalysts may be used alone or in combinations of two or more types. The amount of the hydrogenated catalyst used is normally 0.01 to 100 parts by weight, preferably 0.1 to 50 parts by weight, more preferably 1 to 30 parts by weight with respect to 100 parts by weight of a ring-opening polymer of a norbornene-based monomer. The hydrogenation reaction is normally performed under a hydrogen pressure of 1 to 150 kg/cm$^2$, a temperature range of 0 to 250° C., and a reaction time of 1 to 20 hours.

Addition (co)polymers of norbornene-based monomers and addition type copolymers of norbornene-based monomers and vinyl-based compounds able to be copolymerized with the same may be obtained by the method of for example polymerizing the monomer ingredients at a polymerization temperature of usually −50 to 100° C. and a polymerization pressure of 0 to 50 kg/cm$^2$ in a solvent or not in a solvent in the presence of a catalyst system comprised of a titanium, zirconium, or vanadium compound and organoaluminum compound.

(2) Monocyclic Cyclic Olefin-Based Polymers

As the monocyclic cyclic olefin-based polymers, for example, use may be made of addition polymers of cyclohexene, cycloheptene, cyclooctene, and other monocyclic cyclic olefin-based monomers disclosed in Japanese Unexamined Patent Publication (Kokai) No. 64-66216.

(3) Cyclic Conjugated Diene-Based Polymers

As the cyclic conjugated diene-based polymers, for example, use may be made of polymers obtained by 1,2- or 1,4-addition polymerization of cyclopentadiene, cyclohexadiene, and other cyclic conjugated diene-based monomers and their hydrogenates disclosed at Japanese Unexamined Patent Publication (Kokai) No. 6-136057 or Japanese Unexamined Patent Publication (Kokai) No. 6-258318.

(4) Vinyl Alicyclic Hydrocarbon-Based Polymers

As the vinyl alicyclic hydrocarbon-based polymers, for example, polymers of vinyl cyclohexene, vinyl cyclohexane, and other vinyl alicyclic hydrocarbon-based monomers and their hydrogenates disclosed in Japanese Unexamined Patent Publication (Kokai) No. 51-59989, hydrogenates of aromatic ring portions of polymers of vinyl aromatic monomers such as styrene and α-methylstyrene disclosed in Japanese Unexamined Patent Publication (Kokai) No. 63-43910, Japanese Unexamined Patent Publication (Kokai) No. 64-1706, etc. may be used.

The weight average molecular weight (Mw) of the alicyclic structure-containing thermoplastic is, converted to polyisoprene by high pressure liquid chromatography using cyclohexane as a mobile phase, normally 10,000 to 100,000, preferably 13,000 to 70,000, more preferably 14,000 to 60,000, particularly preferably 15,000 to 50,000. When the Mw is in this range, the mechanical strength and moldability of the light guide plate obtained are well balanced.

Further, the molecular weight distribution (MWD), expressed by the ratio (Mw/Mn) of Mw and the number average molecular weight of the alicyclic structure-containing thermoplastic resin, is usually not more than 4.0, preferably not more than 3.0, more preferably not more than 2.7, particularly preferably not more than 2.5. When the molecular weight distribution is in this range, the mechanical strength and moldability of the light guide plate obtained are well balanced.

These thermoplastic resins including an alicyclic structure may be used alone or in combinations of two or more types.

Other Ingredients

The thermoplastic resin for molding the "light guide plate" according to the present invention may, as needed, include a soft polymer and various types of compounding agents alone or in mixtures of two or more types.

(1) Soft Polymers

In the present invention, the soft polymer to be blended into the thermoplastic resin usually means a polymer having a glass transition temperature (Tg) of not more than 30° C. In the case of a polymer having several Tg's, any polymer having a lowest Tg of not more than 30° C. is included in such a soft polymer.

As such a soft polymer, (a) an olefin-based soft polymer mainly comprised of ethylene, propylene, or another α-olefin, (b) an isobutylene-based soft polymer mainly comprised of isobutylene, (c) a diene-based soft polymer mainly comprised of butadiene, isoprene, or another conjugated diene, (d) a soft polymer having silicon-oxygen bonds as skeletons (organic polysiloxane), (e) soft polymers mainly comprised of α,β-unsaturated acids and their derivatives, (f) soft polymers mainly comprised of unsaturated alcohols and amines or their acyl derivatives or acetal, (g) polymers of epoxy compounds, (h) fluorine-based rubber, (i) other soft polymers, etc. may be mentioned.

As specific examples of these soft polymers, for example, as (a), liquid polyethylene, atactic polypropylene, 1-butene, 4-methyl-1-butene, 1-hexene, 1-octene, and 1-decene and other homo polymers; ethylene-α-olefin copolymers, propylene-α-olefin copolymers, ethylene-propylene-diene copolymers (EPDM), ethylene-cyclic olefin copolymers, ethylene-propylene-styrene copolymers, and other copolymers may be mentioned.

As (b), polyisobutylene, isobutylene-isoprene rubber, isobutylene-styrene copolymers, etc. may be mentioned.

As (c), polybutadiene, polyisoprene, and other conjugated diene homo polymers; a butadiene-styrene random copolymer, isoprene-styrene random copolymer, acrylonitrile-butadiene copolymer, a hydrogenate of an acrylonitrile-butadiene copolymer, an acrylonitrile-butadiene-styrene copolymer, and other random copolymers of conjugated dienes; a butadiene-styrene block copolymer, styrene-butadiene-styrene block copolymer, isoprene-styrene block copolymer, styrene-isoprene-styrene block copolymer, and other block copolymers of conjugated dienes and aromatic vinyl-based hydrocarbons and their hydrogenates may be mentioned.

As (d), dimethyl polysiloxane, diphenyl polysiloxane, dihydroxy polysiloxane, and other silicone rubbers etc. may be mentioned.

As (e), polybutyl acrylate, polybutyl methacrylate, polyhydroxyethyl methacrylate, polyacrylamide, polyacrylonitrile, and other acryl monomer homo polymers; butylacrylate-styrene copolymers, and other copolymers of acryl monomers and other monomers may be mentioned.

As (f), polyvinyl alcohol, polyvinyl acetate, polyvinyl stearate, polyvinyl benzoate, polyvinyl maleate, and other (esterified) unsaturated alcohol homo polymers; vinyl acetate-styrene copolymers and other copolymers of (esterified) unsaturated alcohols and other monomers may be mentioned.

As (g), polyethylene oxide, polypropylene oxide, epichlorohydrin rubber, etc. may be mentioned.

As (h), vinylidene fluoride based rubber, ethylene tetrafluoride-propylene rubber, etc. may be mentioned.

As (i), natural rubber, polypeptide, protein, and the polyester-based thermoplastic elastomer, vinyl chloride-based thermoplastic elastomer, polyamide-based thermoplastic elastomer, etc. disclosed in Japanese Unexamined Patent Publication (Kokai) No. 8-73709, etc. may be mentioned. These soft polymers may have cross-linked structures or may have functional groups introduced by modification.

These soft polymers may be used alone or in mixtures of two or more types. Further, the ratio may be suitably selected within the range not detracting from the object of the present invention.

(2) Compounding Agent

As specific examples of the above various compounding agents, the agents are not particularly limited so long as they are ones generally used in the plastic industry. For example, an antioxidant, UV absorbent, photostabilizer, near infrared absorbent, dye, pigment, or other coloring agent, lubricant, softening agent, anti-static agent, fluorescent brightening agent, filler, or other compounding agent may be mentioned.

As the antioxidant, a phenol-based antioxidant, phosphorus-based antioxidant, sulfur-based antioxidant, etc. may be mentioned. Among these, a phenol-based antioxidant is preferable. An alkyl-substituted phenol-based antioxidant is particularly preferable.

As the phenol-based antioxidant, conventionally known ones may be used. For example, 2-t-butyl-6-(3-t-butyl-2-hydroxy-5-methylbenzyl)-4-methylphenylacrylate, 2,4-di-t-amyl-6-(1-(3,5-di-t-amyl-2-hydroxphenyl)ethyl) phenylacrylate, and other acrylate-based compounds described in Japanese Unexamined Patent Publication (Kokai) No. 63-179953 or Japanese Unexamined Patent Publication (Kokai) No. 1-168643; octadecyl-3-(3,5-di-t-butyl-4-hydroxyphenyl)propionate, 2,2'-methylene-bis(4-methyl-6-t-butylphenol), 1,1,3-tris(2-methyl-4-hydroxy-5-t-butylphenyl)butane, 1,3,5-trimethyl-2,4,5-tris(3,5-di-t-butyl-4-hydroxybenzyl)benzene, tetrakis(methylene-3-(3', 5'-di-t-butyl-4'-hydroxyphenylpropionate)methane [that is, pentaerythrimethyl-tetrakis(3-(3,5-di-t-butyl-4-hydroxyphenylpropionate)], triethyleneglycol bis(3-(3-t-butyl-4-hydroxy-5-methylphenyl)propionate), and other alkyl-substituted phenol-based compounds; 6-(4-hydroxy-3, 5-di-t-butylanilino)-2,4-bisoctylthio-1,3,5-triazine, 4-bisoctylthio-1,3,5-triazine, 2-octylthio-4,6-bis-(3,5-di-t-butyl-4-oxyanilino)-1,3,5-triazine, or other triazine base-containing phenol-based compounds, etc. may be mentioned.

The phosphorus-based antioxidant is not particularly limited so long as it is one which is usually used in the general plastics industry. For example, triphenylphosphate, diphenylisodecyl-phosphate, phenyldiisodecylphosphate, tris(nonylphenyl)phosphate, tris(dinonylphenyl)-phosphate, tris(2,4-di-t-butylphenyl)phosphate, 10-(3,5-di-t-butyl-4-hydroxybenzyl)-9,10-dihydro-9-oxa-10-phosphaphenanthren-10-oxide, and other monophosphate-based compounds; 4,4'-butylidene-bis(3-methyl-6-t-butylphenyl-di-tridecylphosphate), 4,4'isopropylidene-bis (phenyl-di-alkyl($C_{12}$ to $C_{15}$) phosphate), and other diphosphate-based compounds etc. may be mentioned. Among these, a monophosphate-based compound is preferable. Tris(nonylphenyl)phosphate, tris(dinonylphenyl) phosphate, tris(2,4-di-t-butylphenyl)phosphate, etc. are particularly preferred.

As the sulfur-based antioxidant, for example, dilauryl 3,3-thiodipropionate, dimyristyl 3,3'-thiodipropionate, distearyl 3,3-thiodipropionate, laurylstearyl 3,3-thiodipropionate, pentaerythritol-tetrakis-(β-lauryl-thiopropionate, 3,9-bis(2-dodecylthicethyl)-2,4,8,10-tetraoxaspiro[5,5]undecane, etc. may be mentioned.

These antioxidants may be used alone or in combinations of two or more types. The amount of the antioxidant blended is suitably selected within a range not detracting from the object of the present invention, but normally is 0.001 to 5 parts by weight, preferably 0.01 to 1 part by weight with respect to 100 parts by weight of the thermoplastic polymer resin.

As the UV absorbent, for example, 2-(2-hydroxy-5-methylphenyl)2H-benzotriazole, 2-(3-t-butyl-2-hydroxy-5-methylphenyl)-5-chloro-2H-benzotriazole, 2-(3,5-di-t-butyl-2-hydroxyphenyl)-5-chloro-2H-benzotriazole, 2-(3,5-di-t-butyl-2-hydroxyphenyl)-2H-benzotriazole, 5-chloro-2-(3,5-di-t-butyl-2-hydroxyphenyl)-2H-benzotriazole, 2-(3,5-di-t-amyl-2-hydroxyphenyl)-2H-benzotriazole, and other benzotriazole-based UV absorbents;

4-t-butylphenyl-2-hydroxybenzoate, phenyl-2-hydroxybenzoate, 2,4-di-t-butylphenyl-3,5-di-t-butyl-4-hydroxybenzoate, hexadecyl-3,5-di-t-butyl-4-hydroxybenzoate, 2-(2H-benzotriazol-2-yl)-4-methyl-6-(3, 4,5,6-tetrahydrophthalimidylmethyl)phenol, 2-(2-hydroxy-5-t-octylphenyl)-2H-benzotriazole, 2-(2-hydroxy-4-octylphenyl)-2H-benzotriazole, and other benzoate-based UV absorbents;

2,4-dihydroxybenzophenone, 2-hydroxy-4-methylbenzophenone, 2-hydroxy-4-methoxybenzophenone-5-sulfonate 3-hydrate, 2-hydroxy-4-octyloxybenzophenone, 4-dodecaloxy-2-hydroxybenzophenone, 4-benzyloxy-2-hydroxybenzophenone, 2,2',4,4'-tetrahydroxybenzophenone, 2,2'-dihydroxy-4,4'-dimethoxybenzophenone, and other benzophenone-based UV absorbents;

ethyl-2-cyano-3,3-diphenylacrylate, 2'-ethylhexyl-2-cyano-3,3-diphenylacrylate, and other acrylate-based UV absorbents; nickel [2,2'-thiobis(4-t-octylphenolate)]-2- ethylhexylamine, and other metal complex-based UV absorbents etc. may be mentioned.

As photostabilizers, for example, 2,2,6,6-tetramethyl-4-piperidylbenzoate, bis(2,2,6,6-tetramethyl-4-piperidyl) sebacate, bis(1,2,2,6,6-pentamethyl-4-piperidyl)-2-(3,5-di-t-butyl-4-hydroxybenzyl)-2-n-butylmalonate, 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine, and other hindered amine-based photostabilizers may be mentioned.

As the near infrared absorbent, for example, cyanine-based near infrared absorbents; pyrylium-based infrared absorbents; squalilium-based near infrared absorbents; croconium-based UV absorbents; azulenium-based near infrared absorbents; phthalocyanine-based near infrared absorbents; dithiol metal complex-based near infrared absorbents; naphthoquinone-based near infrared absorbents; anthraquionene-based near infrared absorbents; indophenol-based near infrared absorbents; azi-based near infrared absorbents; etc. may be mentioned. Further, the commercially available near infrared absorbents SIR-103, SIR-114, SIR-128, SIR-130, SIR-132, SIR-152, SIR-159, SIR-162 (all made by Mitsui Toatsu Dyes), Kayasorb IR-750, Kayasorb IRG-002, Kayasorb IRG-003, IR-820B, Kayasorb IRG-022, Kayasorb IRG-023, Kayasorb CY-2, Kayasorb CY-4, Kayasorb CY-9 (all made by Nippon Kayaku), etc. may be mentioned.

The dyes are not particularly limited so long as they are ones which uniformly disperse and dissolve in thermoplastic resins including an alicyclic structure, but broad use is made of oil-soluble dyes (various CI solvent dyes) since they are superior in solubility with the thermoplastic hydrocarbon-based polymers used in the present invention. As specific examples of oil-soluble dyes, the various types of CI solvent dyes described in Color Index, vol. 3 of the Societ of Dyes and Colourists may be mentioned.

As pigments, for example, Pigment Red 38 and other dianilide-based pigments; Pigment Red 48:2, Pigment Red 53, Pigment Red 57:1, and other azo lake-based pigments; Pigment Red 144, Pigment Red 166, Pigment Red 220, Pigment Red 221, Pigment Red 248, and other condensation azo-based pigments; Pigment Red 171, Pigment Red 175, Pigment Red 176, Pigment Red 185, Pigment Red 208, and other benzimidazolone-based pigments; Pigment Red 122 and other quinacridone-based pigments; Pigment Red 149, Pigment Red 178, Pigment Red 179, and other perillene-based pigments; and Pigment Red 177 and other anthraquinone-based pigments may be mentioned.

When the light guide plate produced by the process of the present invention requires coloring, both a dye and pigment can be used within the range of the object of the present invention and are not limited, but coloring by a dye is preferable in the case of a light guide plate where microoptical characteristics become a problem. Further, a UV absorbent sometimes appears yellow to red to the eye, while a near infrared absorbent sometimes appears black to the eye. Therefore, there is no need for strictly differentiating between these and dyes in use. Further, they may be used together.

As the lubricant, an ester of an aliphatic alcohol, an ester of a polyhydric alcohol, or a partial ester or other organic compound or inorganic particles etc. may be used. As organic compounds, for example, glyceryl monostearate, glyceryl monolaurate, glyceryl distearate, pentaerythritol monostearate, pentaerythritol distearate, pentaerythritol tristearate, etc. may be mentioned.

As other lubricants, generally it is possible to use inorganic particles. Here, as the inorganic particulates, particles of oxides, sulfides, hydroxides, nitrides, halides, carbonates, sulfates, acetates, phosphates, phosphites, organic carboxylates, silicates, titanates, and borates of elements of Group I, Group II, Group IV, and Groups VI to XIV of the Periodic Table and hydrous compounds or complex compounds, natural compounds, etc. of the same may be mentioned.

As the plasticizer, for example, tricresyl phosphate, trixylyl phosphate, triphenyl phosphate, triethylphenyl phosphate, diphenylcresyl phosphate, monophenyldicresyl phosphate, diphenylmonoxylenyl phosphate, monophenyldixylenyl phosphate, tributyl phosphate, triethyl phosphate, and other phosphate triester-based plasticizers; dimethyl phthalate, dibutyl phthalate, diheptyl phthalate, di-n-octyl phthalate, di-2-ethylhexyl phthalate, diisononyl phthalate, octyldecyl phthalate, butylbenzyl phthalate, and other phthalate ester-based plasticizers; butyl oleate, glyceryl monooleate esters, and other fatty acid-basic acid ester-based plasticizers; divalent alcohol ester-based plasticizers; oxylate ester-based plasticizers; etc. may be used. Among these, phosphate triester-based plasticizers are preferable. Tricresyl phosphate and trixylyl phosphate are particularly preferable.

Further, as specific examples of the plasticizer, squalane ($C_{30}H_{62}$, Mw=422.8), liquid paraffin (White Oil, ISO VG10, ISO VG15, ISO VG32, ISO VG68, ISO VG100, VG8, VG21, etc. defined in JIS), polyisobutene, hydrated polybutadiene, hydrated polyisoprene, etc. may be mentioned. Among these, squalane, liquid paraffin, and polyisobutene are preferred.

As an anti-static agent, stearyl alcohol, behenyl alcohol, and other long-chain alkyl alcohols, glyceryl monostearate, pentaerythritol monostearate, and other fatty acid esters of polyhydric alcohols etc. may be mentioned, but stearyl alcohol and behenyl alcohol are particularly preferable.

These compounding agents may be used mixed in two types or more. The ratio may be suitably selected within a range not detracting from the object of the present invention. The amount blended may be suitably selected within a range not detracting from the object of the present invention, but is normally in a range of 0.001 to 5 parts by weight, preferably 0.01 to 1 part by weight, with respect to 100 parts by weight of the thermoplastic polymer resin.

Molding Material

In the present invention, it is possible to use the above thermoplastic resin alone or a thermoplastic resin plus, as needed, the above soft polymer or compounding agents as the molding material. The molding material is normally kneaded, then extruded into strands in the molten state using a twin-screw kneader and cut into suitable lengths by a strand cutter for pelletization.

Light Guide Plate

The "light guide plate" in the present invention is a member for guiding light of a light source entering a side end face in a direction parallel to the plate face and emitting it in a direction substantially perpendicular to the plate face. It is not limited in application, but means a light guide plate which is used in planar light source devices used as backlights for laptop type, notebook type, book type, palmtop type, and other type PCs, word processors, and other office automation apparatuses, wall hanging and other liquid crystal televisions. and other household electrical appliances, decorative electrical signboards, light tables, viewers, and other display devices.

Next, an explanation will be given of an embodiment of a light guide plate according to the present invention.

First, an explanation will be given of a planar light source device, in particular an edge light type planar light source device.

Figure 1A:
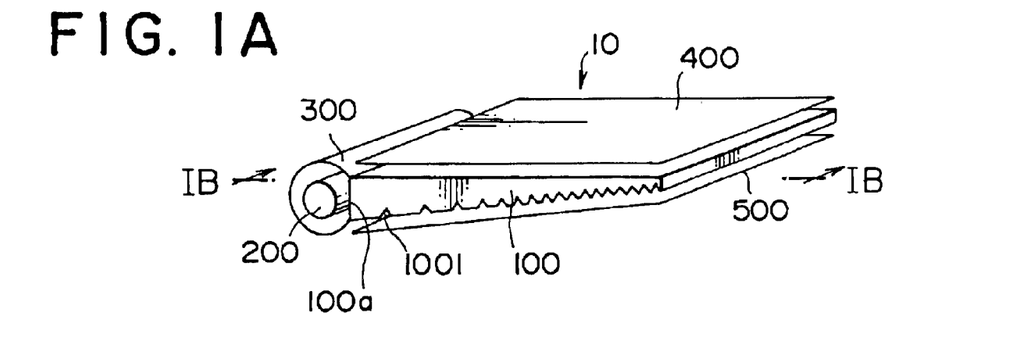
FIG. 1A is a perspective view showing the outline of a planar light source device including a light guide plate of the present embodiment.

For example, as shown in FIG. 1A, the edge light type planar light source device 10 is comprised of a light guide plate 100 for guiding and emitting light from a light source incident from a incidence face 100a in a longitudinal direction, a light source 200 comprised of a cold cathode tube etc. arranged at least at one side face of the light guide plate (in the present embodiment, the incidence face 100a), a lamp reflector 300 arranged so as to surround the light source 200 for efficiently guiding to the light guide plate 100 the light of the light source which did not directly strike the incidence face 100a of the light guide plate 100, a light diffusion sheet 400 arranged at the emission face 100b of the light guide plate 100 for diffusing the light emitted from the emission face 100c, and a reflection sheet 500 arranged at the reflection face 100c side of the light guide plate 100 for returning the light leaking from the light guide plate 100 to the light guide plate 100 once again.

Figure 1B:
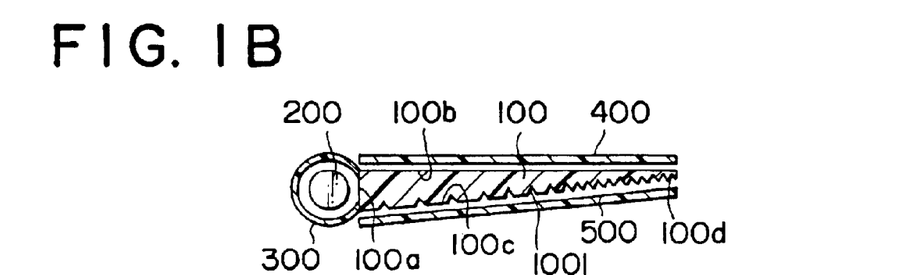
FIG. 1B is a sectional view along the line IB—IB of FIG. 1A.

As shown in FIG. 1B, the light guide plate 100 according to the present embodiment forms a wedge shape so that the sectional shape becomes gradually thinner the further from the light source 200 so that light emitted from the emission face 100b becomes uniform as a whole. Note that the "light guide plate" in the present invention has a thickness of the incidence face 100a of not more than 5 mm, preferably 0.1 to 4 mm, more preferably 0.3 to 3 mm and a thickness of the nonincidence face 100d preferably not more than 4 mm, more preferably 0.05 to 3 mm, still more preferably 0.1 to 2 mm. Further, the ratio of area of the incidence face 100a and the emission end face 100b is, based on the former/latter, 1/5 to 1/500, preferably 1/10 to 1/400, more preferably 1/15 to 1/300. Further, greater effects can be expected in a light guide plate having a length of the diagonal of the emission face 100b of at least 10 inches, preferably at least 14 inches.

Figure 1C:
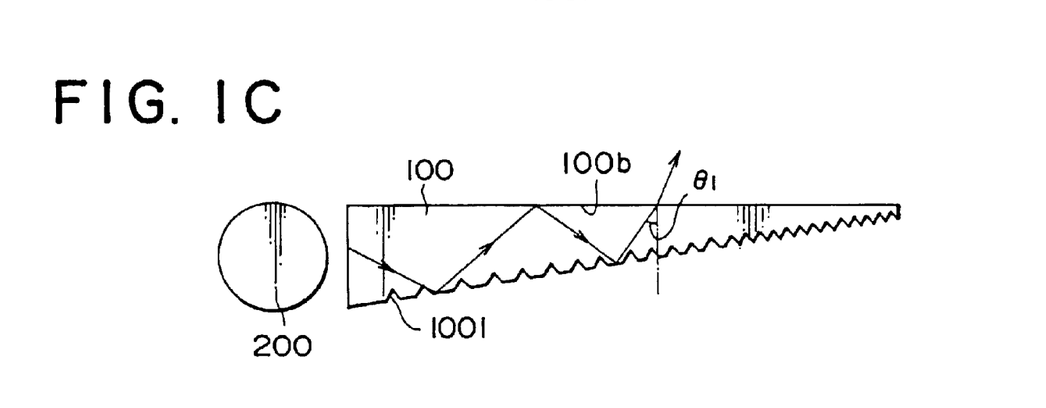
FIG. 1C is an enlarged view of principal parts of FIG. 1B.

As shown in FIG. 1C, in this embodiment, it is possible to use a mold which can give a light guide plate which gives the back face (reflection face 100c) of the light guide plate 100 a pattern comprised of V-grooves 1001 in a gradually increasing density or deeper depth from the incidence face 100a side of the light guide plate to the nonincidence face 100d side.

Figure 1D:
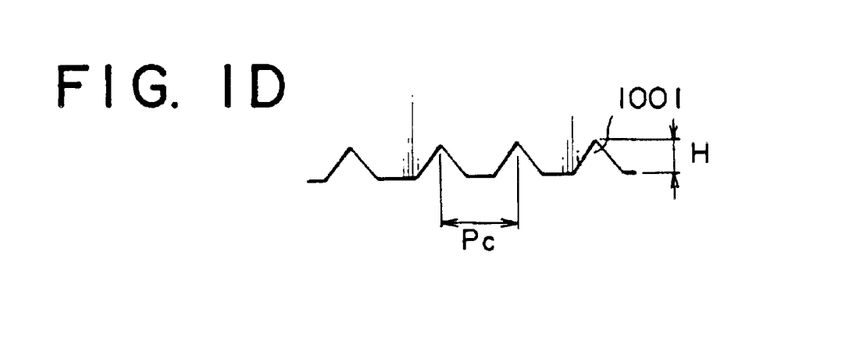
FIG. 1D is a partially enlarged view of the reflection face of FIG. 1C.

The pitch (Pc) (see FIG. 1D) between adjoining V-grooves 1001 in the present embodiment is 10 to 5000 μm, preferably 30 to 1000 μm, more preferably 50 to 500 μm. Further, the height H of the V-groove 1001 is 10 to 5000 μm, preferably 3.0 to 1000 μm, more preferably 50 to 500 μm. Further, the pitch (Pc) at the nonincidence face 100d side of the light guide plate 100 between V-grooves 1001 is preferably 0.5 to 50% smaller than the pitch (Pc) at the incidence face 100a.

Molding Method

As the method for molding the above light guide plate, it is sufficient to use a conventionally known molding method. For example, injection molding, press molding, extrusion blow molding, injection blow molding, multilayer blow molding, connection blow molding, double-wall blow molding, draw blowing, vacuum forming, rotational molding, and other molding methods may be mentioned, but the preferred method is melt molding (for example, hot press molding or injection molding). More preferable is injection molding from the viewpoint of the moldability and productivity. Below, the explanation will be given taking as an example the case of producing a light guide plate by injection molding.

Injection Molding

In the present embodiment, an explanation will be made of the process for production of the above light guide plate 100 by a screw type injection molding machine.

Figure 2A:
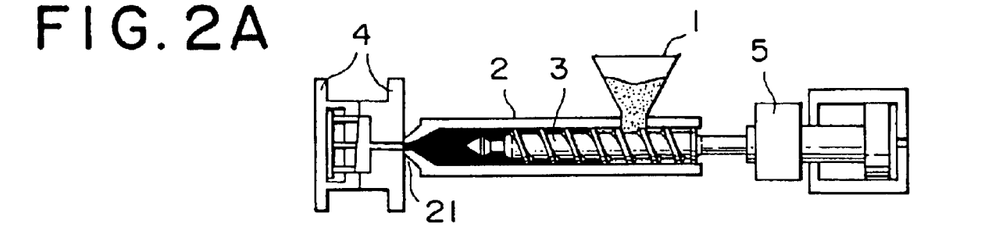
FIG. 2A to FIG. 2E are views for explaining the process of production of a light guide plate of the present embodiment.

The screw type injection molding machine, as shown in FIG. 2A, is comprised of a hopper 1, a heating cylinder 2, a screw 3, a mold 4, and an injection cylinder 5. Note that the process of molding of the present invention is not particularly limited so long as it is suitable for molding a thin-walled and a large screen size.

(1) Charging of Molding Material and Plasticizing and Melting of Same

First, as shown in FIG. 2A, a hopper 1 is charged with a molding material comprised of the above-mentioned thermoplastic resin and other polymers, various compounding agents, and a filler mixed in in accordance with need all mixed in a predetermined ratio, kneaded by for example a twin-screw kneader, and pelletized. The charged molding material falls by its own weight in the heating cylinder 2 to contact the screw 3 and is gradually sent to the front end of the heating cylinder 2 by the rotation of the screw.

Therefore, it is desirable to control the temperature of the heating cylinder 2. The melting temperature of the molding material differs depending on the type of the thermoplastic resin used, but normally is 150 to 400° C., preferably 180 to 360° C., more preferably 190 to 330° C., particularly preferably 200 to 300° C. Therefore, the temperature of the heating cylinder 2 is suitably determined so that the molding material melts well and the resin is not broken down by heat and exhibits a stable, high fluidity in the mold. By maintaining this temperature, it is possible to reduce burn marks of the resin or molding strain. The temperature of the heating cylinder 2 may be controlled by a jacket or heater.

The speed of the screw 3 is suitably determined so that the molding material is homogeneously mixed.

(2) Accumulation of Molding Material and Retraction of Screw

The molding material plasticized and melted in this way is stocked in a predetermined amount at the front end of the screw 3. Along with the progress in the plastization, the screw 3 is retracted by a predetermined distance so as to move away from the nozzle 21 at the front end of the heating cylinder 2 in the heating cylinder 2. At this time, it is preferably to apply a back pressure of 20 to 150 kgf/cm² at the injection cylinder side in a direction suppressing the retraction motion of the screw 3. By making the back pressure 20 to 150 kgf/cm², it is possible to enhance the effect of plastization and kneading of the molding material and possible to prevent the occurrence of bubbles and silver streaks of the molding material.

By making the screw 3 retract a predetermined distance in the heating cylinder 2, a predetermined amount of molding material is stocked near the front end nozzle 21 of the cylinder 2 and made the amount of injection of the molding material injected in the mold 4. The amount of injection is not particularly limited due to the size, thickness, etc. of the light guide plate. The control of the retraction distance is suitably determined by a not shown microswitch etc.

(3) Injection

Figure 2B:
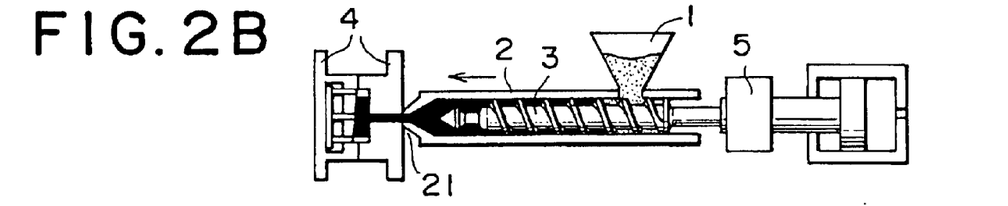
Figure 2C:
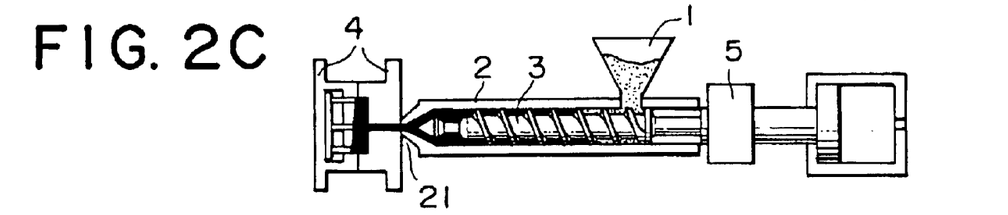
Figure 2D:
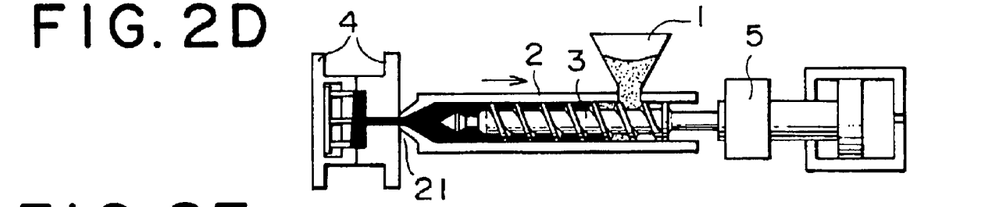

Next, as shown in FIG. 2B and FIG. 2C, the injection cylinder 5 is used to make the screw 3 advance at a predetermined speed toward the nozzle 21 of the heating cylinder 2 to make the plasticized and molten molding material stocked near the nozzle 21 pass through the nozzle 21 and fill the mold 4. After the elapse of a predetermined time, the screw 3 is retracted (see FIG. 2D).

At this time, the injection speed is preferably changed in three stages. That is, first, the screw 3 is made to advance toward the nozzle 21 at a predetermined speed V1 to push the molding material into the sprue and runner. When starting to pass near the gate of the mold, the speed of advance of the screw 3 is reduced to the speed V2, then made a speed V3 faster than the speed V1 of the start of advance. This speed V3 corresponds to the injection speed. Specifically, the injection speed corresponding to the speed V3 of advance of the screw 3 is preferably made 10 to 1000 cm$^3$/s in the present embodiment. If the injection speed is less than 10 cm$^3$/s, it is difficult to obtain a thin-walled, large screen size light guide plate with a high planar accuracy. Luminance unevenness tends to easily occur. On the other hand, the upper limit of the injection speed is preferably determined within a range enabling control of the fluidity of the molding material, but if the injection speed is too fast, the temperature of the molding material rapidly rises due to the shearing force and is liable to become a cause of silver streaks on the shaped article.

Further, the pressure applied to the molding material when injecting the molding material from the nozzle 21 (injection pressure) by making the screw 3 move forward to the nozzle 21 side may be suitably determined by mainly the viscosity characteristic (fluidity) of the molding material, the shape or thickness of the shaped article, or the structure of the mold 4.

The injection pressure is divided into two stages: the stage of injection of the molding material in the mold 4 (hereinafter referred to as the "injection pressure") and the stage after the mold finishes being filled (hereinafter referred to as the "holding pressure"). The injection pressure gradually rises at the time of filling the molding material in the mold and then sharply rises and sharply falls reaching the peak pressure when the mold finishes being filled. The pressure applied inside the mold after that is the "holding pressure".

The holding pressure is the pressure applied for a certain time after the mold is substantially filled by the injection pressure until the gate portion of the mold 4 completely cools and solidifies. The lower limit is at least 100 kgf/cm$^2$, preferably at least 120 kgf/cm$^2$, more preferably at least 150 kgf/cm$^2$. By making the holding pressure at least 100 kgf/cm$^2$, the occurrence of whiskers at the light guide plate of the shaped article is prevented, the mold shrinkage factor can be made small, and a light guide plate superior in dimensional accuracy can be obtained. On the other hand, the upper limit of the holding pressure is preferably determined within the range of the clamping pressure of the mold. If the holding pressure exceeds the clamping pressure of the mold, the mold is liable to open during the cooling. Therefore, the holding pressure is not more than 2000 kgf/cm$^2$, preferably not more than 1500 kgf/cm$^2$, more preferably not more than 1200 kgf/cm$^2$.

In the present embodiment, the peak pressure is 95 to 15% of the holding pressure, more preferably 90 to 40%, most preferably 80 to 60%. If set in this range, it is possible to prevent filling defects (short shots) in the mold 4 and increase the density of the light guide plate of the shaped article and possible to keep the mold shrinkage factor low, so possible to obtain a high precision light guide plate. Further, it is possible to suppress the occurrence of excess burrs in the shaped article and prevent the occurrence of deformation occurring due to excessive internal stress remaining in the shaped article and possible to avoid difficulty of mold release due to over packing in the mold 4 and thereby prevent damage to the mold.

The nozzle size of the injection molding machine is determined so that the molding material does not decompose by heat, but in the present embodiment if using a thermoplastic resin containing an alicyclic structure as a molding material, it is possible to set the nozzle size smaller than in the past.

Further, as a preferable method of molding, use is made of a mold having a value of a ratio S/L (mm$^2$/mm) of the sectional area S of the gate and the maximum flow length L in the cavity of the molding material (molten resin) of at least 0.1, preferably at least 0.2. If the value of SL (mm$^2$/mm) becomes less than 0.1, the mold transferability becomes insufficient and luminance unevenness easily occurs.

The type of the gate is not particularly limited, but a so-called slit gate forming an elongated shape (also called a flat gate or film gate) is preferable.

The length of the short side of the gate in cross-section is normally 5 to 100%, preferably 10 to 100%, particularly preferably 20 to 100%, with respect to the thickness of the light guide plate. Specifically, it is 0.2 to 2.5 mm.

The length of the long side of the gate in cross-section is normally 10 to 100%, preferably 20 to 80%, with respect to the length of the side of the light guide plate. The length of the gate land is not particularly limited, but normally is not more than 3 mm.

The area of the gate is, in terms of the ratio with the area of the side face of the wedge shape having the gate, 1:2 to 1:15, preferably 1:2.5 to 1:10, more preferably 1:3 to 1:5. By injecting the molding material from this portion at this time, the fluid characteristics of the material in the mold are improved, flow marks and whiskers are prevented, no gate marks remain at the light reflection face of the light guide plate, and luminance unevenness is difficult to occur, so gate cutting also become easy.

The gate is usually provided at the portion corresponding to the side face (thickness portion) of the light guide plate. In particular, it is preferable to provide it at the portion where the maximum flow length L in the cavity of the molten resin becomes shorter in the portion corresponding to the side face of the light guide plate. In the light guide plate, if the gate is arranged at the portion corresponding to the light incident face, gate marks sometimes remain at the light incident part. (thickest part), so in this case polishing or other after treatment is necessary after the light incident part is removed from the mold. Therefore, it is preferable to arrange the gate at the side opposite to the light incident part (thinnest part) or the side face.

Note that it is also possible to use a plurality of molds. In this case, it is preferable to arrange the gate to be as symmetrical as possible with respect to the sprue.

Figure 3A:
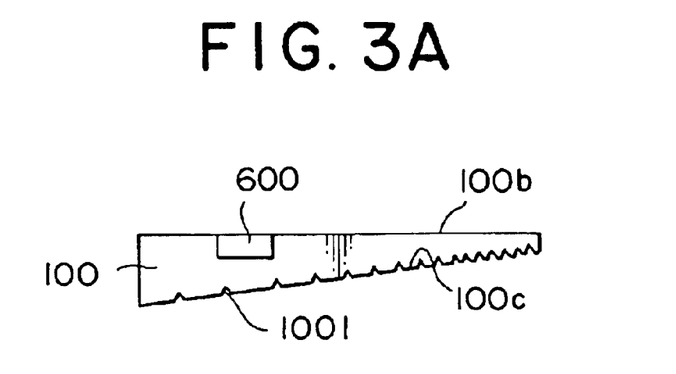
FIG. 3A is a right side view of a light guide plate produced by the process of FIG. 2A to FIG. 2E.
Figure 3B:
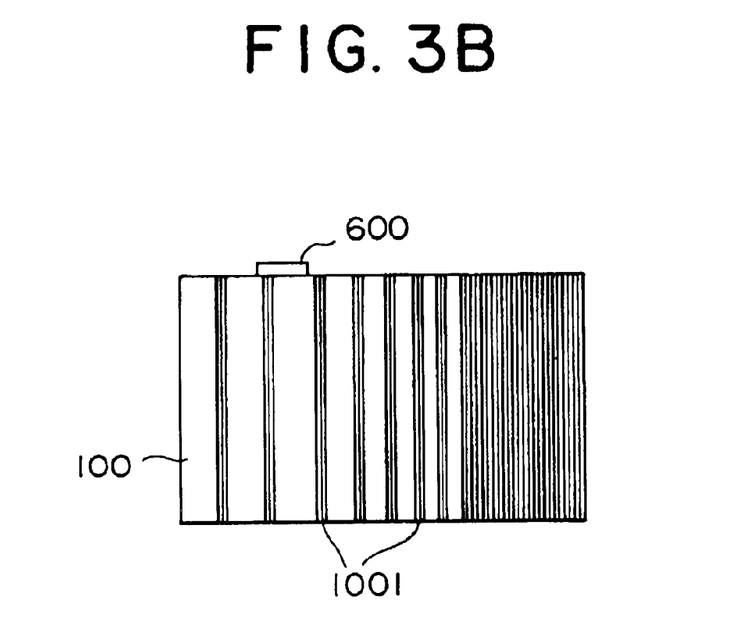
FIG. 3B is a bottom view of FIG. 3A.

In the present embodiment, as shown in FIG. 3A and FIG. 3B, injection molding is performed arranging the gate at the side face of the light guide plate 100 at the light incident face side from near the center so that marks 600 corresponding to the gate remain at the emission face 100b side.

Further, as another preferable method of molding, the molding material is filled in a mold clamped by a mold clamping force of 50 to 250 tons, preferably 60 to 230 tons, at an injection filling pressure of 50 to 600 kgf/cm$^2$, preferably 100 to 400 kgf/cm$^2$, then the mold clamping force is raised to 300 to 500 tons, preferably 350 to 470 tons for molding. That is, both the mold clamping force at the time of filling the molding material and the injection filling pressure are made smaller and the mold clamping force after filling the resin is raised.

The mold clamping force may be adjusted by a known mold clamping method. For example, the toggle method and direct pressure method may be mentioned. Normally, if the mold clamping force is made smaller, burrs occur more easily. In this case, the holding pressure is normally made 600 to 1100 kgf/cm$^2$, preferably 650 to 1050 kgf/cm$^2$.

The mold temperature is preferably set to a range from a temperature 10° C. lower than the glass transition temperature of the resin to be filled in the mold (molding material) to a temperature 40° C. higher than the glass transition temperature of the resin, more preferably a range from the glass transition temperature of the resin to a temperature 20° C. higher than the glass transition temperature of the resin. By making the mold temperature this range, the light guide plate can be obtained without any transfer defects.

(4) Cooling and Solidification of Molding Material

The molding material filled in the mold 4 is held for a certain time in the mold 4 for cooling and solidification.

The cooling time may be suitably changed according to the cylinder temperature, mold temperature, thickness of the shaped article, etc. If the cooling time is extended, it is possible to reduce the deformation of the shaped article, but this ends up lengthening the cycle time and makes release of the shaped article from the mold difficult. On the other hand, if the cooling time is shortened, the solidification of the shaped article becomes insufficient and therefore deformation of the shaped article or deterioration of the dimensional stability ends up being caused. Therefore, it is necessary to determine the optimal cooling time taking into consideration these facts as well. Usually, it is about 1 to 15 minutes.

(5) Extraction of Shaped Article

Figure 2E:
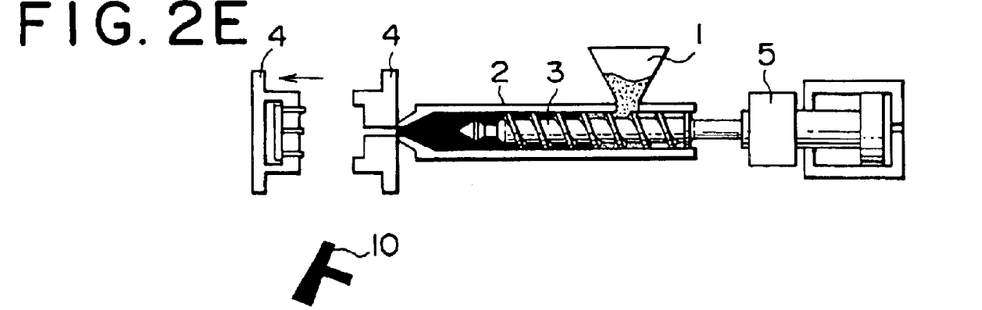

After cooling in the mold for a certain time in this way, the mold is opened and the shaped article (light guide plate 10) is removed, whereupon one cycle of the molding process is completed (see FIG. 2E). This cycle may be performed by either manual operation or automatic operation.

Embodiments of the present invention were explained above, but the present invention is not limited to these embodiments and may be worked in various manners within the range not exceeding the gist of the present invention.

EXAMPLES

Below, the present invention will be described in further detail with reference to production examples, examples of the invention, and comparative examples. The present invention however is not limited to these examples. Further, in the production examples, examples of the invention, and comparative examples below, the parts and percentages are based on weight unless specifically stated otherwise.

The methods of measuring the various physical properties in the following Production Examples 1 to 6, Examples 1 to 6, and Comparative Example 1 were as follows.

The "refractive index" was measured based on ASTM-D542 at 25° C.

The "glass transition temperature (Tg)" was measured based on JIS-K7121.

The "melt flow rate (MFR)" was measured based on JIS-K6719 a load of 2.16 kgf at 280° C. The diameter of a hole of the die was 2.095±0.03 mm, while the distance of movement of the piston was made 25.0±0.25 mm.

The "50% breaking energy of the drop-weight test" was obtained by injection molding a 3 mm thick plate and measurement based on JIS-K-7211 in an atmosphere of a temperature of 23° C. and a relative humidity of 50% dropping a missile-shaped weight of a radius of ¾ inch on the plate.

The "transparency" was measured by measuring the light transmittance (%) while continuously changing the wavelength in a range of 400 to 900 nm by a spectrophotometer (Model U-30 made by Nippon Bunkosha) and defining the minimum transmittance as the light transmittance of the light guide plate. The higher the light transmittance, the better the transparency.

The "appearance and moldability" was determined by checking if there are bubbles, voids, or other defects in the light guide plate obtained by sight or checking if the shapes of the V-grooves have been transferred well and evaluated by the following judgement criteria:

VG (very good): good transfer of shapes of V-grooves

G (good): No problem in molding in transfer of shapes of V-grooves

F (fair): bubbles, voids, burrs, and other defects partially observed and gaps or short shots partially observed in transfer of V-grooves P (poor): bubbles, voids, burrs, and other defects observed and gaps or short shots observed in transfer of V-grooves The "luminance unevenness" was obtained by measuring the luminance at three spots (vertical direction) at equal intervals at each of the thick part and thin part of the face of the light guide plate (rectangular face 1.5 cm inside from the periphery of the face of the light guide plate) using a luminance meter (BM-7, made by Topcon Co.), calculating the luminance unevenness (%) by (minimum value/ maximum value)×100, and evaluating the results by the following judgement criteria:

VG (very good): 88% or more

G (good): 85% to less than 88%

F (fair): 82% to less than 85%

P (poor): less than 82%

The "heat resistance" was evaluated by measuring the dimensional changes due to changes in the environment (temperature changes). A light guide plate is normally used for a long time under irradiation by a light source, so dimensional changes due to temperature often become problems. Therefore, the dimensional change after holding a light guide plate in a gear oven at 100° C. for 24 hours was measured as a representative characteristic and evaluated by the following judgement criteria:

VG (very good): dimensional changes of not more than 0.1%

G (good): dimensional changes of over 0.1% to 0.3%

F (fair): dimensional changes of over 0.3% to 1.0%

P (poor): dimensional changes of over 1.0%

The "mechanical strength" was evaluated by the impact resistance by a drop test. A ¾ inch radius missile-shaped weight (weight 10 g) was allowed to naturally drop from a height of 50 cm on the same positions of 10 prepared light guide plates. The occurrence of cracks or fractures was examined. The evaluation was conducted by the following judgment criteria:

VG (very good): cracks or fractures in zero out of 10 samples

G (good): cracks or fractures in one to three out of 10 samples

F (fair): cracks or fractures in four to six out of 10 samples

P (poor): cracks or fractures in seven or more out of 10 samples

Production Example 1

Bicyclo[2,2,1]hept-2-ene (hereinafter referred to as "NB") (118 kg) was added to a reaction vessel charged with 258 liters of cyclohexane at ordinary temperature in a flow of nitrogen gas and agitated for 5 minutes. Triisobutylaluminum was added to a concentration in the system of 1.0 ml/liter. Next, ethylene was circulated, with agitation, at ordinary pressure to make the system an ethylene atmosphere. The autoclave was held at an inside temperature of 70° C. and pressurized by ethylene to an inside pressure of 6 kg/cm² by gauge pressure. This was agitated for 10 minutes, then 5.0 liters of a toluene solution containing isopropylidene(cyclopentadienyl)(indenyl)zirconium dichloride and methylalmoxan prepared in advance was added to the system so as to initiate the copolymerization reaction of ethylene and NB. The concentration of the catalyst at this time was 0.015 mmol/liter of isopropylidene (cyclopentadienyl)(indenyl)zirconium dichloride to the entire system. The concentration of methylalmoxane was 7.5 mmol/liter.

During the polymerization, ethylene was continuously fed into the system to hold the temperature at 70° C. and the internal pressure at 6 kg/cm$^2$ in gauge pressure. After 50 minutes, the polymerization reaction was stopped by addition of isopropyl alcohol. After the depressurization, the polymer solution was taken out, then brought into contact with an aqueous solution comprised of 1 m$^3$ of water plus 5 liters of concentrated hydrochloric acid in a 1:1 ratio under strong agitation to cause the catalyst residue to move to the aqueous phase. The contact mixture was allowed to stand, then the aqueous phase was separated and removed and the remainder rinsed twice to purify and separate the polymerization solution phase.

The reaction solution was passed through a guard filter, then removed of the solvent and monomer and other volatile components by direct drying using a centrifugal thin film continuous evaporation drier. The obtained molten resin was pelletized by a melt extruder to obtain a copolymer (A) of ethylene and NB.

The weight average molecular weight Mw of the ethylene-NB copolymer (A) obtained in this way measured converted to polyisoprene by a GPC (gel permeation chromatograph) using cyclohexane as a solvent was 38000, the molecular weight distribution Mw/Mn was 2.37, the MFR of the polymer was 55 [g/10 min.], the 50% breaking energy was 0.63 J, the glass transition temperature Tg was 140° C., the refractive index was 1.53, and the NB content calculated by $^{13}$C-NMR was 53 mol %.

Production Example 2

The same procedure was followed as in Production Example 1 other than making the reaction time 46 minutes to obtain an ethylene-NB copolymer (B) having an MFR of 65 [g/10 min.], a 50% breaking energy of 0.48 J, a Tg of 141° C., a refractive index of 1.53, and an NB content of 53%.

Production Example 3

The same procedure was followed as in Production Example 1 other than making the reaction time 20 minutes to obtain an ethylene-NB copolymer (C) having an MFR of 178 [g/10 min.], a 50% breaking energy of 0.31 J, a Tg of 141° C., a refractive index of 1.53, and an NB content of 55%.

Production Example 4

The same procedure was followed as in Production Example 1 for polymerization other than adjusting the internal pressure by the ethylene to become a gauge pressure of 6.4 kg/cm$^2$. The obtained ethylene-NB copolymer (D) had an MFR of 52 [g/10 min.], a 50% breaking energy of 0.19 J, a Tg of 123° C., a refractive index of 1.53, and an NB content of 43%.

Production Example 5

The same procedure was followed as in Production Example 1 other than making the reaction time 17 minutes to obtain an ethylene-NB copolymer (E) having an MFR of 203 [g/10 min.], a 50% breaking energy of 0.10 J, a Tg of 142° C., a refractive index of 1.53, and an NB content of 53%.

Production Example 6

The same procedure was followed as in Production Example 1 for polymerization other than adjusting the internal pressure by the ethylene to become a gauge pressure of 6.8 kg/cm$^2$. The obtained ethylene-NB copolymer (F) had an MFR of 53 [g/10 min.], a 50% breaking energy of 0.03 J, a Tg of 105° C., a refractive index of 1.53, and an NB content of 33%.

Examples 1 to 6

0.2 part of the phenol-based antioxidant pentaerythrityl-tetrakis(3-(3,5-di-t-butyl-4-hydroxyphenyl)propionate) and 0.4 part of the hydrogenated styrene-butadiene-styrene block copolymer (Tuftec H1051 made by Asahi Kasel, crumbs, refractive index of 1.52 at 30° C.) were mixed in 100 parts of each polymer obtained in Production Examples 1 to 6 and kneaded by a twin-screw kneader, then the strands (strand shaped molten resin) were passed through a strand cutter to obtain a pellet- (granular) shaped molded material. These pellets were injection molded to prepare light guide plates A to F. The molding conditions of the injection molding were the use of an injection molding machine of Model IS450 made by Toshiba Machinery, a mold temperature of 60° C., a cylinder temperature of 310° C., a nozzle temperature of 260° C., an injection pressure of 1000 kgf/cm$^2$, a holding pressure of 800 kgf/cm$^2$, a mold clamping pressure of 1200 kgf/cm$^2$, an injection speed (corresponding to screw speed of advance) of 40 cm$^3$/s, a screw back pressure of 70 kgf/cm$^2$, and a screw speed of 30 rpm. Further, the time from the start of filling into the mold to the end of filling was 1 second.

The obtained light guide plate, as shown in FIG. 1A and FIG. 1B, was a wedge shape having a thickness at wide end (100a side) of 2.4 mm, a thickness of the narrow end side (100d side) of 0.5 mm, a length from the wide end to the narrow end side of 180 mm, a length along the axial direction of the linear light source of 320 mm, that is, a 14.5 inches size, and a gradually decreasing thickness in the direction from the wide end side to the narrow end side (direction substantially perpendicular to the center axis of the linear light source). At the time of mold release, no short shots or burrs and no cracks in the shaped article were observed in the shaped articles of Examples 1 to 4 and 6 using the ethylene-NB copolymers (A) to (D) and (F). On the other hand, for Example 5 using the ethylene-NB copolymer (E), while the transfer of the V-grooves was good, since the reaction time at the time of production of the resin was short, some burrs occurred. The light reflection face side of the light guide plate is formed with V-grooves becoming gradually denser the further from the wide end side of the light guide plate to the narrow end side. The V-groove had an apical angle of 110°, a pitch near the light source of 0.3 to 1.5 mm, and a pitch near the narrow end of 0.03 to 0.06 mm. The depth of the groove was made a uniform one of about 80 μm. Further, the transferability of the V-grooves near the narrow end was good. The gate shown in FIG. 3A and FIG. 3B is positioned at the side close to the light incident face from the substantial center portion of the side of the emission face. The gate length was 70 mm and the gate thickness 2 mm.

The existence of bubbles on the surface of the light guide plate was checked by sight, whereupon it was found that there were no bubbles on the surface and the appearance was excellent. Further, the total light transmittance of the light guide plate was measured. The result was that the transparency was all excellent. Further, the mechanical strength was evaluated using this light guide plate, whereupon it was confirmed that the impact resistance was excellent for Examples 1 to 5. For Example 6, however, due to the large ethylene content, a slight decline in the mechanical strength was observed.

A reflection tape of Model RF188 made by Tsujimoto Denki Seisakusho was adhered to the side end face of the light guide plate obtained in this way other than the light incident face. A cold cathode tube of a tube diameter of 2.4 mm made by Harrison Electric was placed at the short side light incident end. The area around the tube and the light guide plate incidence part was covered by a reflector of Model GR38W made by Kimoto Co. Further, a light diffusion sheet of Model PCMSA made by Tsujimoto Denki Seisakusho was placed at the emission face of the light guide plate, while a reflection sheet of Model RF188 made by Tsujimoto Denki Seisakusho was placed at the reflection face of the light guide plate to prepare an edge light type planar light source unit. This unit was used to evaluate the total light transmittance, luminance unevenness, and heat resistance. The results are summarized in Table 1.

Comparative Example 1

The same procedure was performed as in Production Example 1 except for making the reaction time 62 minutes to obtain an ethylene-NB copolymer (F) having an MFR of 40 [g/10 min.], a 50% breaking energy of 0.95 J, a Tg of 139° C., a refractive index of 1.53, and an NB content of 53%. This was molded under similar molding conditions as in Example 1 to obtain a wedge-shaped light guide plate having V-groove shapes.

The light guide plate obtained had the thin-walled part of the wedge shape unfilled and exhibited transfer defects of the V-grooves. The mechanical strength was extremely good, but when evaluating the total light transmittance, luminance unevenness, and heat resistance using a planar light source the same as in Example 1, while the heat resistance was extremely good, luminance unevenness occurred and the light scattered in the light guide plate due to transfer defects of the V-grooves. As a result, the total light transmittance also fell. Note that whether there were bubbles in the surface of the light guide plate was confirmed by sight, whereupon it was found there were bubbles in the surface. The results are shown in Table 1.

The "refractive index", "Tg", "MFR", "transparency", "appearance and moldability", "mechanical strength (impact resistance due to dropping test)", and "heat resistance (where, residence time in gear oven is 720 hours)" were measured in the same way as in Examples 1 to 6.

The "hydrogenation rate" was calculated by measurement of the $^1$H-NMR.

The "front luminance" was obtained by placing a diffusion sheet (100MX, made by Kimoto Co.) at the emission face of the light guide plate formed, turning on the lamp, holding the state for 1 hour, then measuring the luminance at nine points at equal intervals at the long side and short side (vertical direction) of the light emission face of the light guide plate on which the sheet is placed and calculating the average value.

The "luminance unevenness" was measured in the same way as in Examples 1 to 6 and evaluated by the following judgement criteria:

VG (very good): 92% or more
G (good): 88% to less than 92%
F (fair): 84% to less than 88%
P (poor): less than 84%

The "durability test under a high temperature and high humidity environment" was conducted by allowing a sample to stand in a high temperature, high humidity tank of a humidity of 90% and temperature of 80° C. for 1000 hours, rapidly taking it out into a room temperature environment (outside tester), then investigating the turbidity after the elapse of several minutes (change in light transmittance). The light transmittance at 700 nm was measured by a visible UV spectrophotometer, the value of (light transmittance after test/light transmittance immediately after molding)× 100 was calculated, and an evaluation was conducted under the following judgement criteria.

VG (very good): 98% or more
G (good): 96% to less than 98%
F (fair): 94% to less than 96%
P (poor): less than 94%

Production Example 7

1.22 parts of 1-hexene diluted by 10 parts of cyclohexane, 0.11 part of dibutyl ether, and 0.22 part of triisobutylaluminum were placed into a reaction and mixed with 250 parts

TABLE 1

| | Resin | MFR (g/10 min) | Breaking energy (J) | NB content (mol %) | TG (° C.) | Total light transmittance (%) | Luminance unevenness | Appearance and moldability | Heat resistance | Mechanical strength |
|---|---|---|---|---|---|---|---|---|---|---|
| Ex. 1 | Ethylene-NB(A) | 55 | 0.63 | 53 | 140 | 92 | G | G | VG | VG |
| Ex. 2 | Ethylene-NB(B) | 65 | 0.48 | 53 | 141 | 92 | VG | VG | VG | VG |
| Ex. 3 | Ethylene-NB(C) | 178 | 0.31 | 55 | 141 | 92 | VG | VG | VG | VG |
| Ex. 4 | Ethylene-NB(D) | 52 | 0.19 | 43 | 123 | 91 | G | G | G | G |
| Ex. 5 | Ethylene-NB(E) | 203 | 0.1 | 53 | 142 | 92 | VG | F | VG | G |
| Ex. 6 | Ethylene-NB(F) | 53 | 0.03 | 33 | 105 | 89 | G | G | G | F |
| Comp. Ex. 1 | Ethylene-NB(G) | 40 | 0.95 | 53 | 139 | 90 | P | P | VG | VG |

In the following Production Examples 7 to 9, Examples 7 to 9, and Comparative Example 2, the various physical properties were measured by the following methods:

of dehydrated cyclohexane in a nitrogen atmosphere at room temperature, then 100 parts of tricyclo(4,3,0,1$^{2,5}$)deca-3,7-diene (hereinafter referred to as DCP) and 30 parts of a 0.70% toluene solution of tungsten hexachloride were continuously added over 2 hours while holding the mixture at 45° C. for polymerization.

The adjusted polymerization reaction solution was transported as it was to a pressure-resistant hydrogenation reactor, 10 parts of a diatomaceous earth-carrying nickel catalyst were added, and a reaction was caused at 180° C. at a hydrogen pressure of 45 kgf/cm$^2$ for 10 hours. This solution was filtered by a filter provided with a stainless steel mesh using diatomaceous earth as a filtration aid to remove the catalyst. The obtained reaction solution was poured into 3000 parts of isopropyl alcohol with agitation to cause the precipitation of the hydrogenate. This was then recovered by filtration. Further, the filtrate was washed by 500 parts of acetone, then dried in a reduced pressure drier set to not more than 1 torr and 100° C. to obtain 95 parts of a ring-opening polymer hydrogenate (A)

The MFR of the obtained ring-opening polymer hydrogenate (A) was 54 [g/10 min.], the ratio of the repeating units including an alicyclic structure in the total polymer repeating units was 100 mol %, the TG was 94° C., the refractive index was 1.53, the hydrogenation rate was 99.9%, the weight average molecular weight (Mw) obtained from high pressure liquid chromatography (converted to polyisoprene) using cyclohexane as a transport layer was 31500, and the molecular weight distribution (Mw/Mn) was 2.10.

Production Example 8

The same procedure was followed as in Production Example 7 other than making the amount of addition of 1-hexene added 1.35 parts to obtain a ring-opening polymer hydrogenate (B).

The MFR of the obtained ring-opening polymer hydrogenate (B) was 185 [g/10 min.], the ratio of the repeating units including an alicyclic structure in the total polymer repeating units was 100 mol %, the TG was 93° C., the refractive index was 1.53, the hydrogenation rate was 99.9%, the weight average molecular weight (Mw) obtained from high pressure liquid chromatography (converted to polyisoprene) using cyclohexane as a mobile phase was 19200, and the molecular weight distribution (Mw/Mn) was 2.08.

Production Example 9

The same procedure was followed as in Production Example 7 other than making the amount of addition of 1-hexene added 1.40 parts to obtain a ring-opening polymer hydrogenate (C).

The MFR of the obtained ring-opening polymer hydrogenate (C) was 259 [g/10 min.], the ratio of the repeating units including an alicyclic structure in the total polymer repeating units was 100 mol %, the TG was 93° C., the refractive index was 1.53, the hydrogenation rate was 99.9%, the weight average molecular weight (Mw) obtained from high pressure liquid chromatography (converted to polyisoprene) using cyclohexane as a transport layer was 13500, and the molecular weight distribution (Mw/Mn) was 2.05.

Examples 7 to 9

The same procedure was followed as in Examples 1 to 6 to prepare light guide plates other than using the ring-opening polymer hydrogenates A to C obtained in Production Examples 7 to 9, making the mold temperature 80° C., and making the cylinder temperature 280° C. (Examples 7 and 9) or 290° C. (Example 8).

Each obtained light guide plate, as shown in FIG. 1A and FIG. 1B, had a wedge shape having a thickness at the wide end (100a side) of 2.2 mm, a thickness of the narrow end side (100d side) of 0.5 mm, a length from the wide end to the narrow end side of 190 mm, a length along the axial direction of the linear light source of 250 mm, and a gradually decreasing thickness in the direction from the wide end side to the narrow end side (direction substantially perpendicular to the center axis of the linear light source). At the time of mold release, no short shots or burrs and no cracks in the shaped article were observed.

The light reflection face side of the light guide plate is formed with V-grooves becoming gradually denser the further from the wide end side of the light guide plate to the narrow end side. The shape of a V-groove was made the same as in Examples 1 to 6. The shown in FIG. 3A and FIG. 3B is positioned at the side close to the light incident face from the substantial center portion of the side of the emission face. The gate length was 50 mm and the gate thickness 1.9 mm.

Further, the existence of bubbles on the surface of the light guide plate was checked by sight, whereupon it was found that there were no bubbles on the surface and the appearance was excellent. Further, the total light transmittance of the light guide plate was measured. The result was that the transparency was excellent in all cases. Further, the mechanical strength was evaluated using each light guide plate, whereupon it was confirmed that the impact resistance was excellent. The heat resistance of each light guide plate obtained was also excellent. Further, the results of the durability test of the obtained light guide plate under a high temperature, high humidity environment were also excellent.

The same procedure was followed as in Examples 1 to 6 using each light guide plate obtained in this way to prepare edge light type planar light source units. The front luminance and luminance unevenness were evaluated using these units. The above results are summarized in Table 2.

Comparative Example 2

The same procedure was followed as in Production Example 7 other than making the amount of addition of 1-hexene added 0.84 part to obtain a ring-opening polymer hydrogenate (D).

The MFR of the obtained ring-opening polymer hydrogenate (D) was 15 [g/10 min.], the ratio of the repeating units including an alicyclic structure in the total polymer repeating units was 100 mol %, the Tg was 95° C., the refractive index was 1.53, the hydrogenation rate was 99.9%, the weight average molecular weight (Mw) obtained from high pressure liquid chromatography (converted to polyisoprene) using cyclohexane as a mobile phase was 42000, and the molecular weight distribution (Mw/Mn) was 2.20.

This resin was molded under the same molding conditions as in Example 7 other than making the cylinder temperature 290° C. to obtain a wedge-shaped light guide plate having V-grooves.

The obtained light guide plate was free of short shots at the thin-walled part of the wedge shape, but transfer defects of the V-grooves were observed. The mechanical strength, heat resistance, and durability under a high temperature and high humidity environment of the light guide plate were all extremely good, but the transparency fell. Further, when evaluating the front luminance and luminance unevenness using a planar light source unit the same as Example 7, luminance unevenness occurred and the front luminance also fell. Note that whether there were bubbles in the surface of the light guide plate was checked by sight, whereupon it was found that there were bubbles in the surface. The results are shown in Table 2.

TABLE 2

|  | Polymer | MFR (g/10 min) | Ratio of alicyclic structural units (mol %) | TG (° C.) | Total light transmittance (%) | Front luminance (cd/cm$^2$) | Luminance unevenness | Appearance and moldability | Heat resistance | Mechanical strength | Durability under high temp. and high humidity |
|---|---|---|---|---|---|---|---|---|---|---|---|
| Ex. 7 | Ring opening hydrate A | 54 | 100 | 94 | 92 | 1800 | VG | VG | VG | VG | VG |
| Ex. 8 | Ring opening hydrate B | 185 | 100 | 93 | 92 | 1860 | VG | VG | VG | VG | VG |
| Ex. 9 | Ring opening hydrate C | 259 | 100 | 93 | 92 | 1900 | VG | G | VG | G | VG |
| Comp. Ex. 2 | Ring opening hydrate D | 15 | 100 | 95 | 91 | 1300 | F | P (bubbles) | VG | VG | VG |

What is claimed is:

1. A light guide plate, characterized by
comprising an incidence face into which light from a light source is introduced,
an emission face intersecting with said incidence face, from which light introduced from the incidence face is emitted, and
a nonincidence face side facing to said incidence face side;
and being obtained by melt molding a soft polymer, and
a thermoplastic resin containing alicyclic structure having a melt flow rate of at least 50 [g/10 min.] under a load of 2.16 kgf at 280° C.

2. The light guide plate as set forth in claim 1, having a sectional shape becoming gradually thinner from a side of said incidence face to a side of a nonincidence face.

3. The light guide plate as set forth in claim 2, wherein the length of a diagonal of said emission face is at least 10 inches.

4. The light guide plate as set forth in claim 2, wherein the thickness of said incidence face is not more than 5 mm and the thickness of said nonincidence face is not more than 4 mm.

5. The light guide plate as set forth in claim 2, wherein a reflection face facing said emission face is formed with grooves as a pattern of fine shapes.

6. The light guide plate as set forth in claim 1, wherein said thermoplastic resin containing alicyclic structure has a 50% breaking energy of at least 0.01 J in a drop-weight test, measured for a 3 mm thick plate of the same using a missile weight of a radius of ¾ inch.

7. The light guide plate as set forth in claim 1, wherein said thermoplastic resin containing alicyclic structure has a glass transition temperature of at least 70° C.

8. The light guide plate as set forth in claim 1, wherein said thermoplastic resin containing alicyclic structure is a norbornene-base polymer.

9. A method of producing a light guide plate, characterized by
comprising an incidence face into which light from a light source is introduced,
an emission face intersecting with said incidence face, from which light introduced from the incidence face is emitted, and
a nonincidence face side facing to said incidence face side;
and being obtained by melt molding a soft polymer, and
a thermoplastic resin containing alicyclic structure having a melt flow rate of at least 50 [g/10 min.] under a load of 2.16 kgf at 280° C.

10. The method of producing a light guide plate as set forth in claim 9, wherein said melt molding is injection molding.

* * * * *